United States Patent [19]
Alonso-Cedo

[11] Patent Number: 5,752,230
[45] Date of Patent: May 12, 1998

[54] METHOD AND APPARATUS FOR IDENTIFYING NAMES WITH A SPEECH RECOGNITION PROGRAM

[75] Inventor: Teodoro G. Alonso-Cedo, Aurora, Ill.

[73] Assignee: NCR Corporation, Dayton, Ohio

[21] Appl. No.: 697,182

[22] Filed: Aug. 20, 1996

[51] Int. Cl.⁶ ................................................. G10L 3/00
[52] U.S. Cl. .................................... 704/270; 704/275
[58] Field of Search .............................. 704/270, 275, 704/2, 7

[56] References Cited

U.S. PATENT DOCUMENTS

| | | | |
|---|---|---|---|
| 5,204,894 | 4/1993 | Darden | 379/88 |
| 5,212,730 | 5/1993 | Wheatley et al. | 381/43 |
| 5,329,608 | 7/1994 | Bocchieri et al. | 395/2.52 |
| 5,355,433 | 10/1994 | Yasuda et al. | 395/2.52 |
| 5,452,340 | 9/1995 | Engelbeck et al. | 379/67 |
| 5,452,397 | 9/1995 | Ittycheriah et al. | 395/2.49 |
| 5,454,063 | 9/1995 | Rossides | 395/2.84 |

*Primary Examiner*—David R. Hudspeth
*Assistant Examiner*—Robert Louis Sax
*Attorney, Agent, or Firm*—Ying Tuo

[57] ABSTRACT

To generate a correct name via a speech recognizer, a name database is used to store proper names. A user first spells a name to the speech recognizer that recognizes the spelled name. If two or more homophonic names exist in the name database corresponding to the spelled name, the user then pronounces the name, based on which the intended name is selected. As an alternative, a user can first pronounces a name to the speech recognizer that recognizes the pronounced name. If two or more homophonic names exist in the name database corresponding to the pronounced name, the user then spells the name, based on which the intended name is selected.

16 Claims, 6 Drawing Sheets

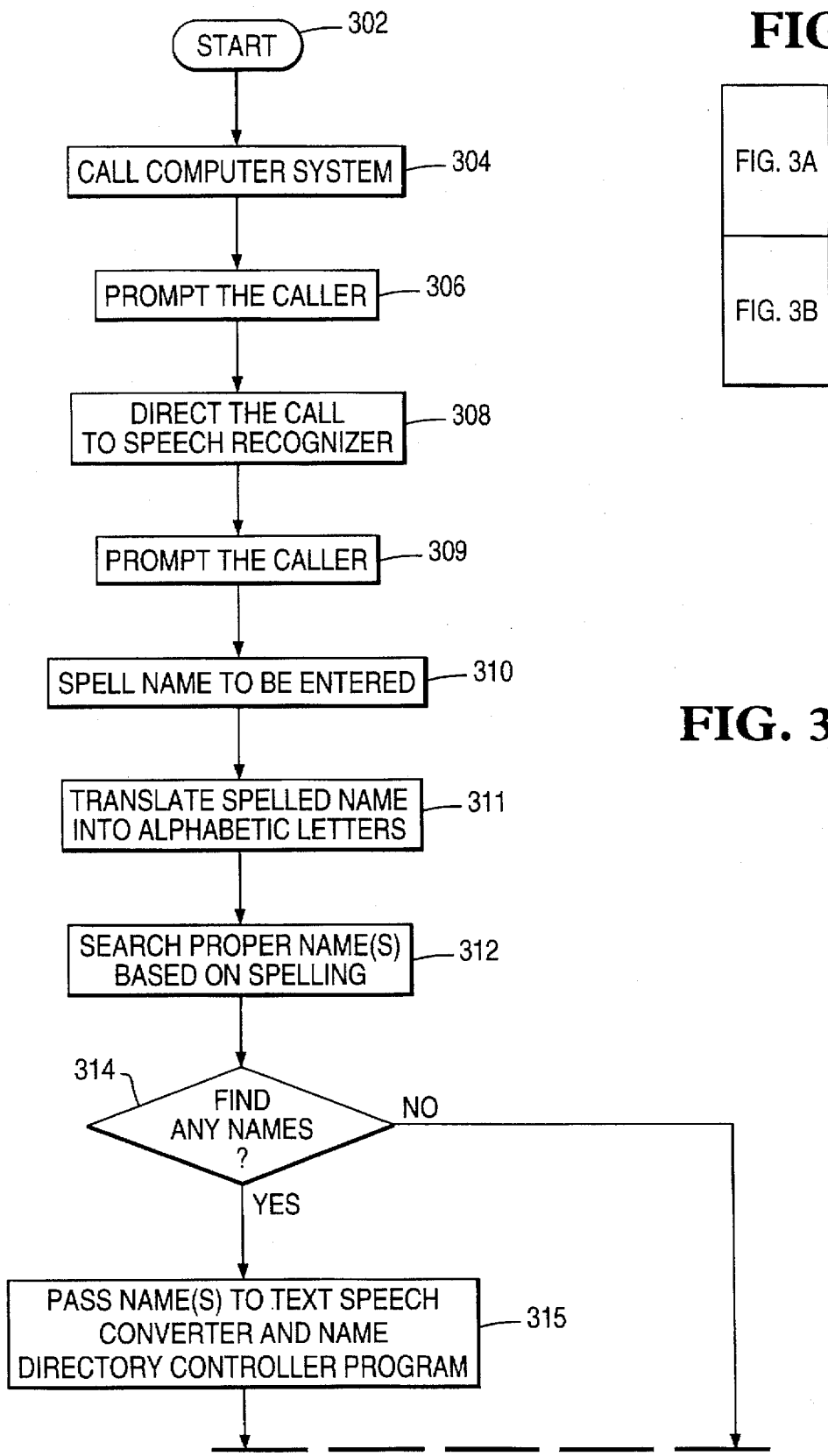
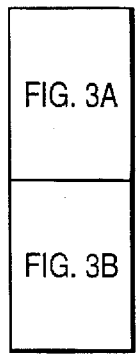
FIG. 3
FIG. 3A

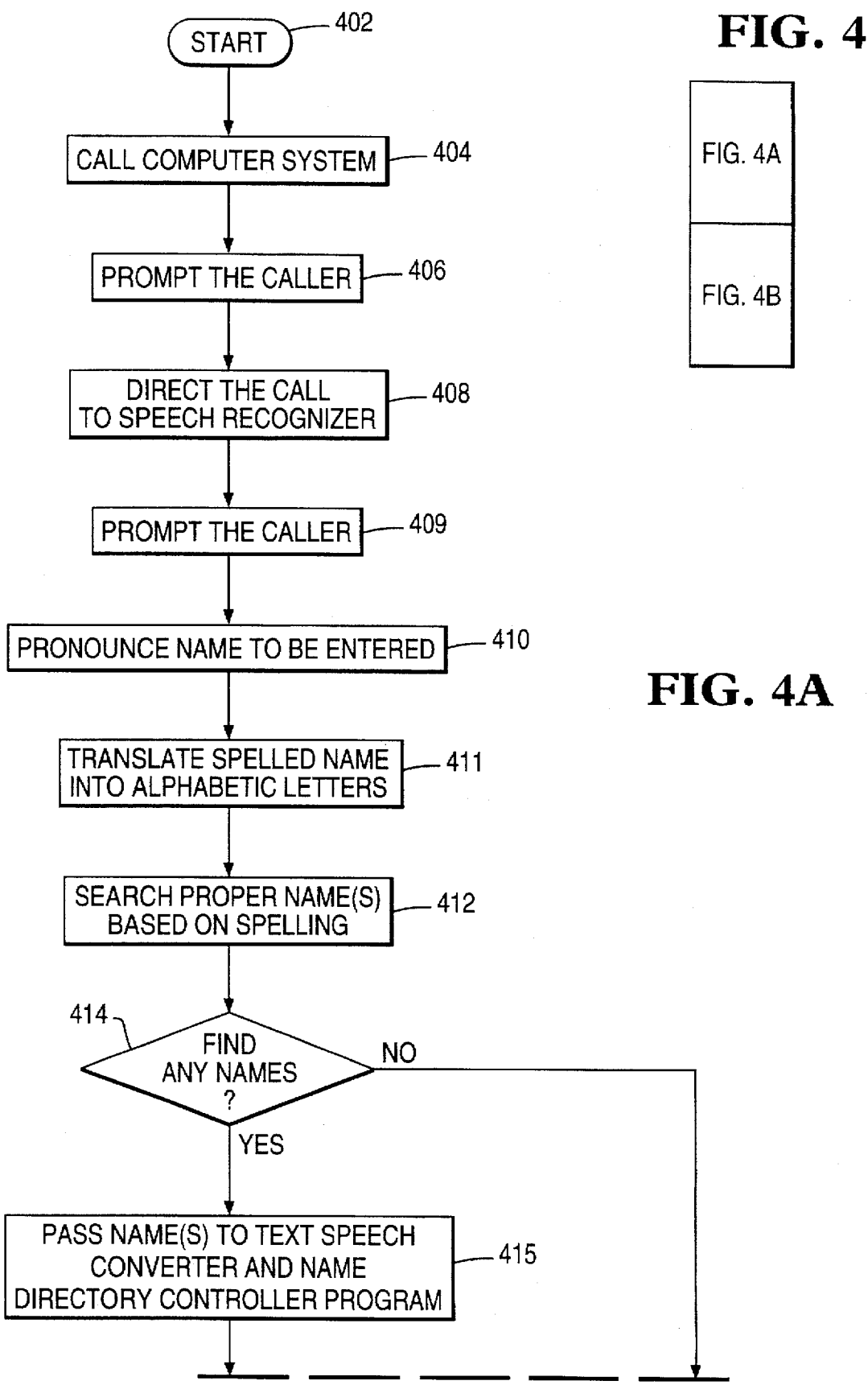
FIG. 4
FIG. 4A

METHOD AND APPARATUS FOR IDENTIFYING NAMES WITH A SPEECH RECOGNITION PROGRAM

BACKGROUND OF THE INVENTION

The present invention relates generally to a method and an apparatus for identifying a word based on spelling and/or pronunciation, and more specifically to a method and an apparatus for identifying a name to be entered into an electronic directory based on spelling and/or pronunciation.

An electronic directory that contains customized names and corresponding telephone numbers can be used to facilitate making or connecting a phone call. For example, in connecting an incoming call, a telephone system can prompt the caller to spell or pronounce the name of a person to be reached. A speech recognition program converts the spoken name into a format usable by the telephone system. The telephone system then searches the name in the electronic directory and connects the incoming call to the extension that associates with the name to be reached. In making a call, a caller can spell or pronounce the name to be called to a speech recognition program in a telephone system. The speech recognition program converts the spoken name into a format usable by the telephone system. The telephone system then searches the name in the electronic directory and makes the call to the person that matches the name given by the caller.

To provide convenience to users, it is sometimes desirable that an electronic directory can be remotely accessed and updated via a communication link (such as telephone line).

U.S. Pat. No. 5,204,894 discloses a personal electronic directory that provides subscribers the ability to store names and numbers through audio signals by calling a special number. U.S. Pat. No. 5,329,608 discloses an apparatus and an method for recording data in a speech recognition system and recognizing spoken data corresponding to the recorded data. Applicant incorporates these two patents into the present application by reference.

However, problem occurs in using a speech recognition program to recognize a spoken name, when the spoken name corresponds to several homophonic names. Unfortunately, existing technology does not provide a good level of efficiency, flexibility and reliability in identifying a spoken name from the homophonic names.

Therefore, there has been a need to provide improved method and apparatus for identifying a spoken word from two or more homonyms by using a speech recognition system, with efficiency, flexibility and reliability.

There has been another need to provide improved method and apparatus for remotely accessing and entering names by using a speech recognition system, with efficiency, flexibility and reliability.

The present invention meets these needs.

SUMMARY OF THE INVENTION

In one aspect, the invention provides a method for selecting a name based on spelling and pronunciation. The method comprises the steps of:

(a) receiving a name spelled by a user;

(b) identifying possible names that match said spelled name;

(c) receiving a name pronounced by the user; and (d) selecting a name from said possible names in reference to said pronounced name.

In another aspect, the invention provides a method for selecting a name based on pronunciation and spelling. The method comprises the steps of:

(a) receiving a name pronounced by a user;

(b) identifying possible names that match said pronounced name;

(c) receiving a name spelled by said user; and (d) selecting a name from said possible names in reference to said spelled name.

The present invention also provides respective apparatuses corresponding to the first and second aspects.

The features and advantages of the present invention will become apparent from the following description and accompanying drawings.

BRIEF DESCRIPTION OF THE DRAWINGS

The purpose and advantages of the present invention will be apparent to those skilled in the art from the following detailed description in conjunction with the appended drawing, in which.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to be accorded with the broadest scope consistent with the principles and features disclosed herein.

Figure 1:
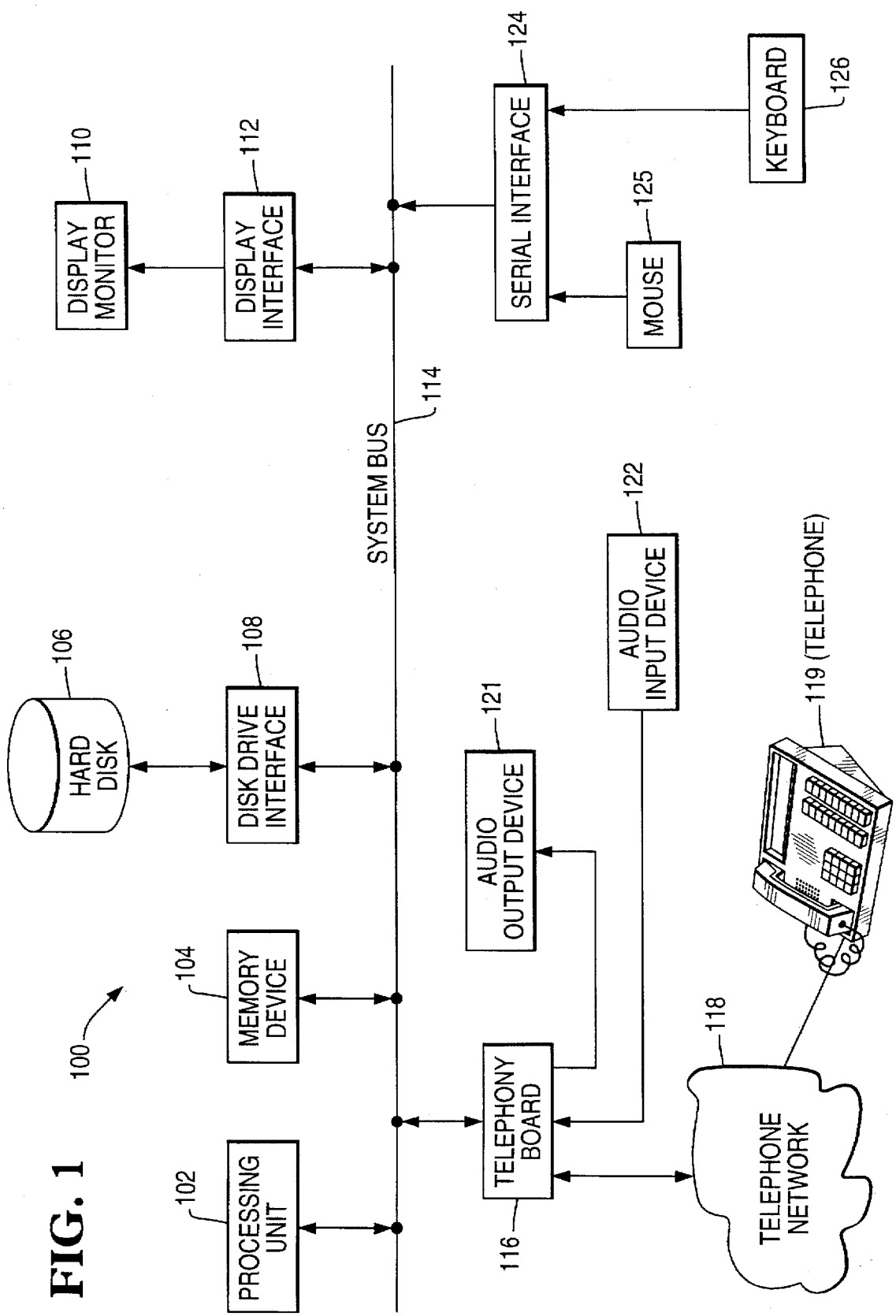
FIG. 1 depicts a computer system 100 that can be used to implement the present invention.

Referring now to FIG. 1, there is shown a computer system 100 that can be used to implement the present invention.

As shown in FIG. 1, the computer system comprises a processing unit 102, a memory device 104, a hard disk 106, a disk drive interface 108, a display monitor 110, a display interface 112, a telephony board 116 coupled to telephone network 118, an audio output device 121, an audio input device 122, a serial interface 124, a mouse 125, a keyboard 126, and a system bus 114.

Connected to telephone network 118 is a telephone set 119.

Hard disk 106 is coupled to disk drive interface 108; display monitor 110 is coupled to display interface 112; audio output device 121 and audio input devices 122 are coupled to telephony board 116; and mouse 125 and keyboard 126 is coupled to serial interface 124. Coupled to system bus 114 are processing unit 102, memory device 104, disk drive interface 108, display interface 112, telephony board 116, and serial interface 124.

Memory device 104 is able to store programs (including instructions and data). Operating together with disk drive interface 108, hard disk 106 is also able to store programs. However, memory device 104 has faster access speed than hard disk 106, while hard disk 106 has higher capacity than memory device 104.

Operating together with display interface 112, display monitor 110 is able to provide visual interface between programs being executed and a user.

Telephony board 116 contains hardware circuitry and software program that are able to answer phone calls, to translate audio signal from audio input device 122 to a data stream suitable for use in speech recognizer 204, and to translate a data stream to audio signal suitable for use by audio output device 121.

Operating together with telephony board 116, audio output device 121 is able to convert text message into audio signal recognizable to human ears, and audio input device 122 is able to convert audio signal to a data stream suitable for use by computer system 100 (shown in FIG. 1).

Operating together with serial interface 124, mouse 125 and keyboard 125 are able to provide inputs to computer system 100.

Processing unit 102 has access to memory device 104 and hard disk 106, and is able to control operations of computer system 100 by executing programs stored in memory device 104 or hard disk 106. Processing unit 102 is also able to control the transmissions of programs and data between memory device 104 and hard disk 106.

Figure 2:
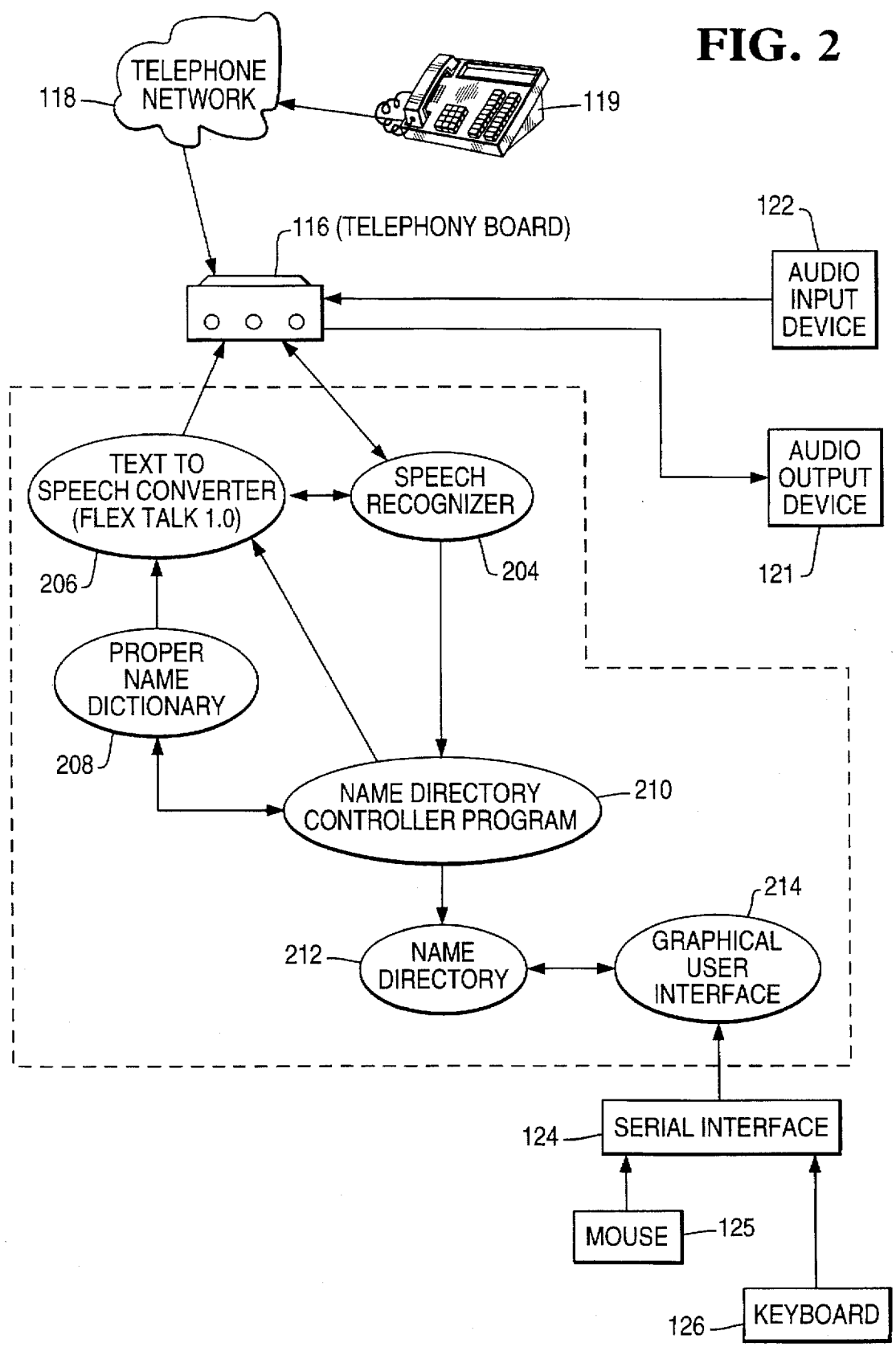
FIG. 2 depicts the software structure of computer system 100, in which software function blocks are delineated in dotted lines, in accordance with the present invention.

Referring to FIG. 2, there is shown software structure of computer system 100, in which software function blocks are delineated in dotted line, in accordance with the present invention.

As shown in FIG. 2, computer system 100 includes a speech recognizer 204, a text to speech converter 206, a proper name dictionary 208, a name directory controller program 210, a name directory 212, and a graphical user interface 214.

Speech recognizer 204 is able to translate between a data stream representing speech and the actual text or letters it represents.

Text to speech converter 206 (such as Flex Talk 1.0 software in Bell Laboratory's Watson System) is able to translate text to a data stream, representing the text as spoken by a person, which is suitable for use by telephony board 116.

Proper name dictionary 208 is able to store proper names in text format.

Name directory controller program 210 is able to control access to and update name directory 212.

Name directory 212 is able to store names and associated telephone numbers.

Graphical user interface 214 is able to provide a graphical interface to get access to the information contained in name directory 212.

Each of the software function blocks shown in FIG. 2 can be stored either in memory device 102 or hard disk 106, and be executed or accessed by processing unit 102.

Figure 3B:
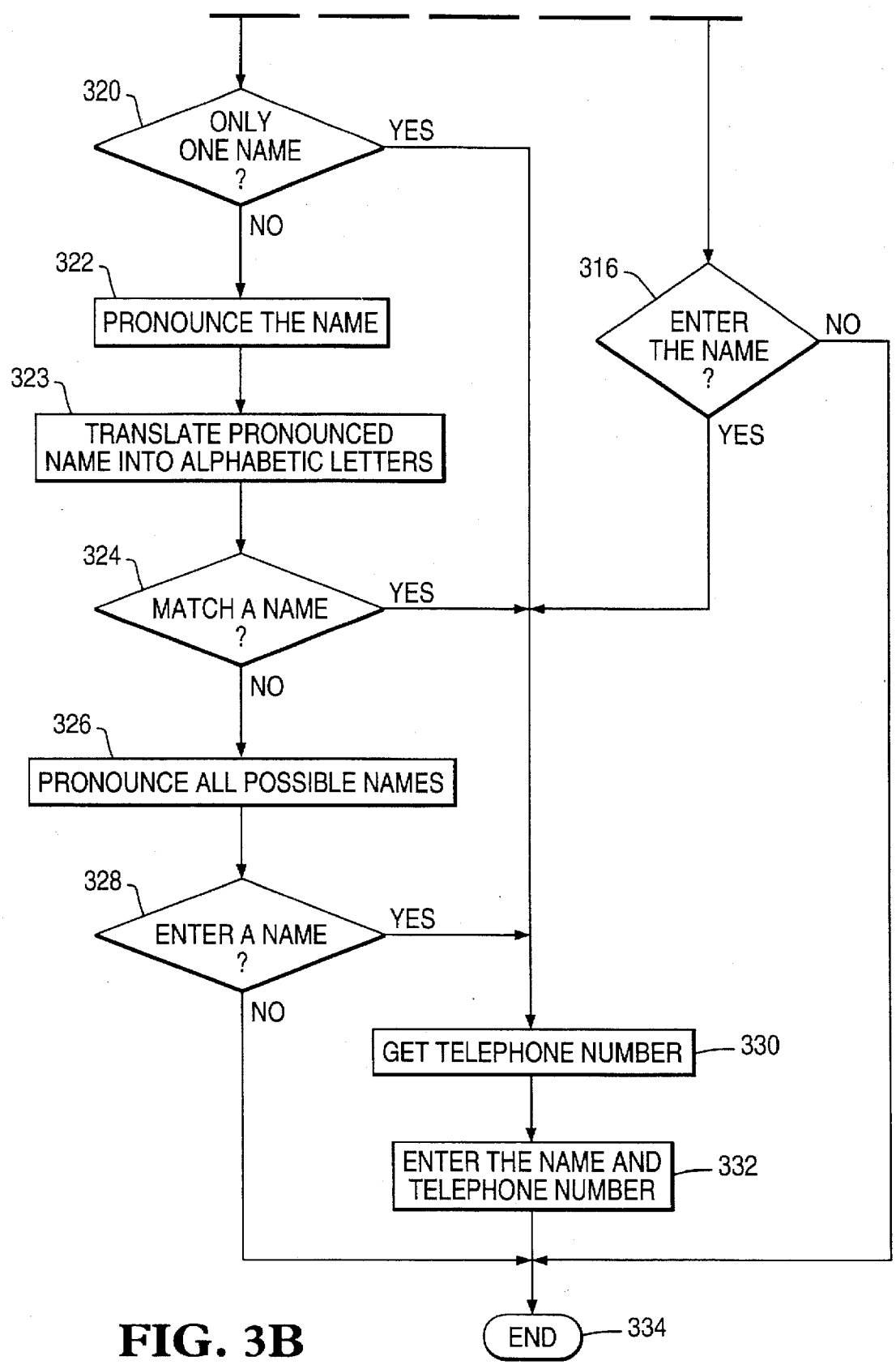
FIG. 3 (including 3A and 3B) is a flow chart illustrating operation of identifying a spoken name, in accordance with one embodiment of the present invention.

Referring to FIG. 3 (including 3A and 3B), there is shown a flow chart illustrating operation of identifying a spoken name, in accordance with one embodiment of the present invention. In step 304, a user calls computer system 100 via telephone network 118 by using telephone set 119.

In step 306, telephony board 116 answers the phone call and prompts the caller to say "enter a name to name directory" if the caller intends to do so.

In step 308, telephony board 116 directs the call to speech recognizer 204 after confirming that the caller intends to enter a name to name directory 212.

In step 309, speech recognizer 204 instructs text to speech converter 206 to send a data stream to telephony board 116. Upon receiving the data stream, telephony board 116 prompts the caller to spell the name to be entered.

In step 310, the user spells the name to be entered. To facilitate discussion in the following, it is assumed that the user has spelled name "A-l-o-n z-o".

In step 311, speech recognizer 204 translates the spelled name into alphabetic letters in text format and passes them to name directory controller program 210.

In step 312, name directory controller program 210 searches proper name directory 208 based on the spelled name.

In step 314, name directory controller program 210 determines whether any names in proper name directory 208 match the name spelled. If there are any names in proper name directory 208 matching the name spelled, the operation is led to step 315. If there are no names in proper name directory 208 matching the name spelled, the operation is led to step 316.

In step 316, name directory controller program 210 instructs text to speech converter 206 to send a data stream to telephony board 116. Upon receiving the data stream, telephony board 116 repeats the name spelled and prompts whether the caller wants to enter the name spelled. If the caller's answer is "no", the operation is led to step 334 to end the operation. If the caller's answer is "yes", the operation is led to step 330 to enter the name and associated telephone number into name directory 212.

After name directory controller program 210 has determined that one or more names in proper name directory 208 mach the spelled name in step 314, in step 315, proper name directory 212 sends the name(s) to text to speech converter 206 and name directory controller program 210. Since, as above assumed above, the caller spelled name "A-l-o-n-z-o" in step 310, step 314 finds two possible names, namely "Alonzo" and "Alonco", because "z" and "c" are homophones.

In step 320 name directory controller program 210 further determines whether there is only one name that matches the name spelled. If there is only one name that matches the name spelled, the operation is led to step 330 to store the name and telephone number associated with the name into name directory 210. If there is more than one name that matches the name spelled, the operation is led to step 322.

In step 322, name directory controller program 210 instructs text to speech converter 206 to prompt (via telephony board 116) the caller to pronounce the name previously spelled. For the purpose of discussion, it is assumed that the caller pronounces "Alonco".

In step 323, speech recognizer 204 translates the pronounced name into alphabetic letters in text format and passes them to name directory controller program 210.

In step 324, name directory controller program 210 determines whether the pronounced name matches one of the possible names passed to it in step 315. (Since it is assumed that the caller pronounced "Alonzo" in step 322, step 324 selects "Alonco", instead of "Alonzo", as the name to be entered into name directory 212. Note: "co" is pronounced as "ko".). If the determination is positive, the operation is led to step 330 to store the name and associated telephone number into name directory 212. If the determination is negative, the operation is led to step 326.

In step 326, text to speech converter 206 pronounces (or spells) all possible names to the caller and asks whether the caller wants to select one of the possible names to be entered into name directory 212. If the caller does not want to select any of the possible names, the operation is led to step 334 to end the operation. If the caller selects one of the possible names, the operation is led to step 330.

In step 330, text to speech converter 206 prompts (via telephony board 116) the caller to speak the telephone number associated with the name. Upon receiving the spoken telephone number from the caller, speech recognizer 204 converts the spoken telephone number into numerical telephone number in text format and passes it to name directory controller program 210.

In step 332, name directory controller program 210 stores the name and associated telephone number into name directory 212. The operation then ends at step 334.

Figure 4B:
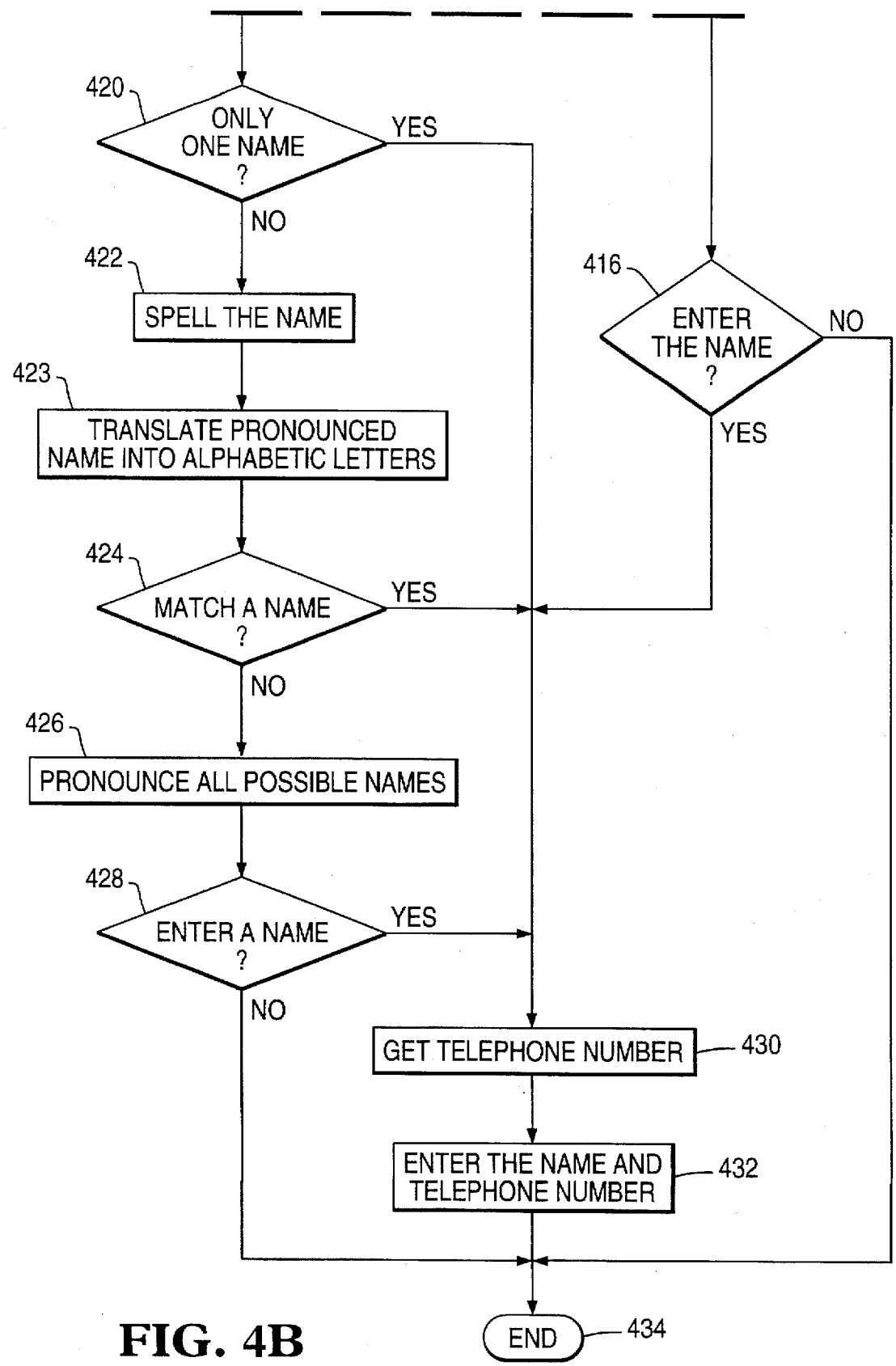
FIG. 4 (including 4A and 4B) is a flow chart illustrating operation of identifying a spoken name, in accordance with another embodiment of the present invention.

Referring to FIG. 4 (including 4A and 4B), there is shown a flow chart illustrating operation of identifying a spoken name, in accordance with another embodiment of the present invention. It can be noted that the operation shown in FIG. 4 is similar to that shown in FIG. 3. Specifically, in the operation of FIG. 3, a user first spells a name, and then pronounces the name so that the intended name can be selected from two or more homophonic names. Whereas in the operation of FIG. 4, a user first pronounces a name, and then spells the name so that the intended name can be selected from two or more homophonic names.

In step 404, a user calls computer system 100 via telephone network 118 by using telephone set 119.

In step 406, telephony board 116 answers the phone call and prompts the caller to say "enter a name to name directory" if the caller intends to do so.

In step 408, telephony board 116 directs the call to speech recognizer 204 after confirming that the caller intends to enter a name to name directory 212.

In step 409, speech recognizer 204 instructs text to speech converter 206 to send a data stream to telephony board 116. Upon receiving the data stream, telephony board 116 prompts the caller to pronounce the name to be entered.

In step 410, the user pronounces the name to be entered. To facilitate discussion in the following, it is assumed that the user has pronounced name "Jonesy".

In step 411, speech recognizer 204 translates the pronounced name into alphabetic letters in text format and passes them to name directory controller program 210.

In step 412, name directory controller program 210 searches proper name directory 208 based on the pronounced name.

In step 414, name directory controller program 210 determines whether any names in proper name directory 208 match the name pronounced. If there are any names in proper name directory 208 matching the name pronounced, the operation is led to step 415. If there are no names in proper name directory 208 matching the name pronounced, the operation is led to step 416.

In step 416, name directory controller program 210 instructs text to speech converter 206 to send a data stream to telephony board 116. Upon receiving the data stream, telephony board 116 repeats the name pronounced and prompts whether the caller wants to enter the name pronounced. If the caller's answer is "no", the operation is led to step 434 to end the operation. If the caller's answer is "yes", the operation is led to step 430 to enter the name and associated telephone number into name directory 212.

After name directory controller program 210 has determined that one or more names in proper name directory 208 mach the pronounced name in step 414, in step 415, proper name directory 212 sends the name(s) to text to speech converter 206 and name directory controller program 210. Since, as above assumed above, the caller pronounced name "Jonesy" in step 410, step 414 finds two possible names, namely "Jonesy" and "Jonecy", because "sy" and "cy"are homophones.

In step 420 name directory controller program 210 further determines whether there is only one name that matches the name pronounced. If there is only one name that matches the name pronounced, the operation is led to step 430 to store the name and telephone number associated with the name into name directory 210. If there is more than one name that matches the name pronounced, the operation is led to step 422.

In step 422, name directory controller program 210 instructs text to speech converter 206 to prompt (via telephony board 116) the caller to spell the name previously pronounced. For the purpose of discussion, it is assumed that the caller spells "J-o-n-e-s-y".

In step 423, speech recognizer 204 translates the pronounced name into alphabetic letters in text format and passes them to name directory controller program 210.

In step 424, name directory controller program 210 determines whether the spelled name matches one of the possible names passed to it in step 415. (Since it is assumed that the caller spelled "J-o-n-e-s-y" in step 422, step 424 selects "Jonesy", instead of "Jonecy", as the name to be entered into name directory 212). If the determination is positive, the operation is led to step 430 to store the name and associated telephone number into name directory 212. If the determination is negative, the operation is led to step 426.

In step 426, text to speech converter 206 pronounces (or spells) all possible names to the caller and asks whether the caller wants to select one of the possible names to be entered into name directory 212. If the caller does not want to select any of the possible names, the operation is led to step 434 to end the operation. If the caller selects one of the possible names, the operation is led to step 430.

In step 430, text to speech converter 206 prompts (via telephony board 116) the caller to speak the telephone number associated with the name. Upon receiving the spoken telephone number from the caller, speech recognizer 204 converts the spoken telephone number into numerical telephone number in text format and passes it to name directory controller program 210.

In step 432, name directory controller program 210 stores the name and associated telephone number into name directory 212. The operation then ends at step 334.

For the names that cannot be recognized by speech recognizer 204, a user can enter the name into name directory 212, via graphical user interface 214, mouse 125 and keyboard 126. A user can also edit name directory 212, via graphical user interface 214, mouse 125 and keyboard 126. In addition to receiving name spelled (or pronounced) from telephone set 119, speech recognizer 204 can also receive name spelled (or pronounced) from sound input device 122.

It should be noted that methods described in FIGS. 3 and 4 can also be used to select an intended name from name directory 212 in auto-dialing, if more than one name is found in name directory 212 in corresponding to a spelled or pronounced name. Specifically, a user can spell (or pronounce) the name to be called to sound input device 121. Telephony board 116 converts the name (in audio signal format) into digital format. Upon receiving name in digitized format from telephony board 116, speech recognizer 204 converts the name into text format. Upon receiving the name in text format, directory controller program 210 searches name directory 212. If more than one name is found from name directory 212, name directory controller program 210 instructs text to speech converter 206 to prompt the user to pronounce (or spell) the name to be called. The name to be called can be selected based on user's further pronunciation (or spelling). Based on the selected name, name directory controller program 210 locates the telephone number associated with the name and sends the telephone number to a dial tone generator (not shown). The tone generator generates dial tone to telephone network 118.

It should be also noted that methods described in FIGS. 3 and 4 can also be used to select an intended name from name directory 212 in auto extension connection, if more than one name is found in name directory 212 in corresponding to a spelled or pronounced name.

It should be further noted that, even though the embodiments in the present specification describe the methods of identifying a person's name, the principle here also applies to identify any works that consist of letters.

Preferably, the program that performs the steps shown in FIGS. 3 and 4 can be stored in memory device 104 or hard disk 106.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for selecting a name based on spelling and pronunciation, comprising the steps of:
    (a) receiving a name spelled by a user;
    (b) identifying possible names that match said spelled name;
    (c) receiving a name pronounced by said user; and
    (d) selecting a name from said possible names in reference to said pronounced name.

2. The method of claim 1, further comprising the step of:
    (e) entering said selected name into a database.

3. The method of claim 2, further comprising the step of:
    (f) updating said database through a graphical user interface.

4. The method of claim 1, said possible names being homophonic names.

5. An apparatus for selecting a name based on spelling and pronunciation, comprising:
    (a) means for receiving a name spelled by a user;
    (b) means for identifying possible names that match said spelled name;
    (c) means for receiving a name pronounced by said user; and
    (d) means for selecting a name from said possible names in reference to said pronounced name.

6. The apparatus of claim 5, further comprising:
    (e) means for entering said selected name into a database.

7. The apparatus of claim 6, further comprising:
    (f) means for updating said database through a graphical user interface.

8. The apparatus of claim 5, said possible names being homophonic names.

9. A method for selecting a name based on pronunciation and spelling, comprising the steps of:
    (a) receiving a name pronounced by a user;
    (b) identifying possible names that match said pronounced name;
    (c) receiving a name spelled by said user; and
    (d) selecting a name from said possible names in reference to said spelled name.

10. The method of claim 9, further comprising the step of:
    (e) entering said selected name into said database.

11. The method of claim 10, further comprising the step of:
    (f) updating said database through a graphical user interface.

12. The method of claim 9, said possible names being homophonic names.

13. An apparatus for selecting a name based on pronunciation and spelling, comprising:
    (a) means for receiving the name pronounced by a user;
    (b) means for retrieving possible names that match said pronounced name;
    (c) means for receiving the name spelled by said user; and
    (d) means for selecting the name from said possible names in reference to said spelled name.

14. The apparatus of claim 13, further comprising:
    (e) means for entering said selected name into said database.

15. The apparatus of claim 14, further comprising:
    (f) means for updating said database through a graphical user interface.

16. The apparatus of claim 13, said possible names being homophonic names.

* * * * *